US012727720B2

(12) United States Patent
Hyust et al.

(10) Patent No.: US 12,727,720 B2
(45) Date of Patent: Sep. 8, 2026

(54) COOKWARE SYSTEM SUITABLE FOR COOKING, SMOKING AND/OR BAKING

(71) Applicant: TURBO TRUSSER LLC, Canton, OH (US)

(72) Inventors: Kirk W. Hyust, Canton, OH (US); Brian Halasinski, Canton, OH (US)

(73) Assignee: TURBO TRUSSER LLC, Canton, OH (US)

(*) Notice: Subject to any disclaimer, the term of this patent is extended or adjusted under 35 U.S.C. 154(b) by 6 days.

(21) Appl. No.: 18/931,304

(22) Filed: Oct. 30, 2024

(65) Prior Publication Data

US 2025/0134319 A1 May 1, 2025

Related U.S. Application Data

(60) Provisional application No. 63/546,508, filed on Oct. 30, 2023.

(51) Int. Cl.

| | |
|---|---|
| ***A47J 43/28*** | (2006.01) |
| ***A47G 21/08*** | (2006.01) |
| ***A47G 21/14*** | (2006.01) |
| ***A47J 36/02*** | (2006.01) |
| ***A47J 37/10*** | (2006.01) |
| ***A47J 43/00*** | (2006.01) |
| ***A47J 45/06*** | (2006.01) |
| ***A47J 45/10*** | (2006.01) |
| *A47J 45/07* | (2006.01) |

(52) U.S. Cl.

CPC ............ *A47J 45/061* (2013.01); *A47G 21/08* (2013.01); *A47J 36/02* (2013.01); *A47J 45/10* (2013.01); *A47G 21/145* (2013.01); *A47J 37/10* (2013.01); *A47J 43/287* (2013.01); *A47J 45/071* (2013.01); *Y10S 220/912* (2013.01)

(58) Field of Classification Search

CPC ...... A47G 19/06; A47G 19/186; A47G 19/02; A47G 21/08; A47G 21/145; A47G 21/14; A47G 21/06; A47J 36/00; A47J 43/287; A47J 43/288; A47J 45/061; A47J 45/10; A47J 47/005; B65D 77/245

USPC .... 99/422; 220/573.1, 574, 574.1, 912, 756, 220/735, 771; 269/15, 302.1

See application file for complete search history.

(56) References Cited

U.S. PATENT DOCUMENTS 217,938 A * 7/1879 Graves .................... A47J 37/10 99/422
769,119 A * 8/1904 Strickland ............... A47J 36/20 99/403

(Continued)

OTHER PUBLICATIONS

Turbo Trusser Website (Year: 2025).*
U.S. Pat. No. 823,415, Krampitz, issued Jun. 12, 1906 ** could not enter the patent above as the form would not allow.

*Primary Examiner* — Gideon R Weinerth

(74) *Attorney, Agent, or Firm* — Hudak, Shunk & Farine Co. LPA

(57) ABSTRACT

Cookware system suitable for cooking, smoking and/or baking food in or on a cooking device. The cookware system includes a tray having a food cooking surface. A handle is integrally connected to the tray that can be utilized to manipulate the tray when the handle is at ambient room temperatures. The handle includes a slot which accepts a serving utensil having a handle and an implement for manipulating food.

19 Claims, 10 Drawing Sheets

(56) References Cited

U.S. PATENT DOCUMENTS 1,627,575 A * 5/1927 Rovelli ................. A47J 43/287
16/110.1
2,283,019 A * 5/1942 Serr ........................ A47J 29/00
220/573.1
2,590,286 A * 3/1952 Wirtanen ............. A47G 21/145
248/37.6
2,840,292 A * 6/1958 Stoddard ............ A47G 19/2205
D7/505
4,695,029 A * 9/1987 Fox ........................ B65D 23/12
248/230.1
5,370,263 A * 12/1994 Brown ...................... E06C 7/14
220/756
5,673,885 A * 10/1997 Pham ........................ E06C 7/14
248/210
6,032,822 A * 3/2000 Munari ................. A47J 43/287
220/573.1
D448,977 S * 10/2001 Bleimaier ................... D7/553.6
D484,251 S * 12/2003 Pruett ............................ D25/68
D565,900 S * 4/2008 Franco ........................... D7/536
D571,150 S * 6/2008 Franco ........................... D7/536
D580,214 S 11/2008 Dodane
D598,711 S * 8/2009 Franco ........................... D7/505
D629,654 S * 12/2010 Moon ......................... D7/553.6
7,845,656 B2 * 12/2010 Thompson ............... B25H 3/00
280/47.35
D645,310 S * 9/2011 Shamoon ....................... D7/698
9,290,953 B2 * 3/2016 Grimm ................... E04F 21/02
D773,260 S * 12/2016 Shamoon ....................... D7/698
D878,869 S * 3/2020 Kashiwada .................... D7/536
D891,171 S 7/2020 Papet et al.
D932,252 S * 10/2021 Mayer ............................ D7/603
11,701,916 B2 * 7/2023 Zambrotta ............. B44D 3/123
220/697
D1,110,100 S * 1/2026 Hyust ............................ D7/354
D1,110,104 S * 1/2026 Hyust ............................ D7/354
2005/0145637 A1 7/2005 Lin
2006/0278097 A1 * 12/2006 Piccirilli ................. A47J 37/10
99/422
2008/0237960 A1 * 10/2008 Shamoon .............. A47J 47/005
269/302.1
2009/0308870 A1 * 12/2009 Chapman .............. A47J 43/281
220/350
2011/0049163 A1 * 3/2011 Perry .................. A47J 43/0727
220/573.1
2012/0225178 A1 9/2012 Degnan
2013/0037553 A1 * 2/2013 Bourbeau ............. A47J 45/061
220/573.1
2015/0053707 A1 2/2015 Borovicka et al.
2019/0276208 A1 * 9/2019 Becker ............... B65D 43/0231
2021/0022560 A1 1/2021 Servaites et al.
2021/0186264 A1 6/2021 Nevarez
2021/0361099 A1 * 11/2021 Wolfe ................ A47G 19/2205
2023/0014523 A1 1/2023 Navarro
2025/0134319 A1 * 5/2025 Hyust .................... A47G 21/08

* cited by examiner

COOKWARE SYSTEM SUITABLE FOR COOKING, SMOKING AND/OR BAKING

FIELD OF THE INVENTION

The present invention relates a cookware system suitable for cooking, smoking and/or baking food in or on a cooking device, for example an oven, cooktop, smoker, griddle or grill. The cookware system includes a tray comprising a food cooking surface adapted to be placed on a horizontal surface of a cooking device, for example, a grate, a cooktop, or a burner. A handle is integrally connected to the tray that can be utilized to manipulate the tray when the handle is at ambient room temperatures. The handle includes a slot which accepts a serving utensil having a handle and an implement for manipulating food. The implement may include a spreader, spoon, spatula, knife, fork, spork or the like. During cooking, the serving utensil is preferably not utilized. When the food has been cooked or it is desired to move the heated tray and handle, the implement of the serving utensil can be inserted into the slot and the serving utensil handle utilized to move or otherwise transport the cookware system including the tray having food cooked or cooking thereon.

BACKGROUND OF THE INVENTION

A number of devices are known in the art for use in smoking and baking food, in particular cream cheese. Pieces of cream cheese are often packaged using a foil wrapper. Some cooks will unwrap the cream cheese, and place the foil wrapper directly on a cooking surface in order to cook the cream cheese thereon or smoke the cream cheese if the cooking surface is within a food smoker or other similar device. Due to the generally flimsy nature of the foil wrapper, it is difficult to move the cream cheese around the cooking surface when necessary in order to properly cook or smoke the cream cheese.

Still further, when utilizing a foil wrapper, if toppings are added to the top of a cooked cream cheese piece, excess toppings will fall onto the foil wrapper, which can be difficult to then utilize because the foil wrapper often does not have a flat surface and collects toppings and/or cream cheese in depressions or voids.

In view of these problems, the inventors sought a solution for a device that is recyclable and can be utilized repeatedly and reliably to smoke and/or bake foods such as cream cheese, as well as to provide a device wherein added toppings could be substantially fully utilized.

Yet another problem to be solved was the need for a device that could be used to easily move a food substance around on a cooking surface without causing harm or injury to the user by preventing contact with a heated surface which may cause burns for example.

Various cooking devices are known in the art.

U.S. Pat. No. 823,415 relates a culinary utensil including a frying pan, a detachable handle, a bread-pan and a cover.

U.S. D580,214 relates to an ornamental design for a pan having a removable handle.

U.S. 2005/0145637 relates to a pot including a pot body having a rim formed with a protruding pot ear, and a removable handle mounted on the pot body and including a grip mounted on the pot body and rested on the pot ear of the pot body, and a locking member pivotally mounted on the grip and detachably engaged with the pot ear of the pot body. Thus, the removable handle is combined with the pot ear of the pot body rigidly and stably. In addition, the removable handle encompasses the whole periphery of the pot ear, so that the removable handle is combined with the pot ear closely.

U.S. 2012/0225178 relates to a barbecue pan having a body portion. The body portion is characterized as having side walls and a substantially planar mesh base extending therefrom. A receiving element extends from the body portion and a handle is provided which is removably appended to the receiving element.

U.S. 2015/0053707 relates to a cooking utensil that has a food container, such as a cooking basket, and a lift bracket attached the sidewall of the food container. The lift bracket includes a riser portion having a catch opening and an outwardly extending upper ledge portion having an insertion opening in vertical plane alignment with the catch opening of the riser portion. A lift handle engages the lift bracket on the food container through the insertion opening in the lift bracket. An inwardly projecting catch tip on the engagement end of the lift handle can be made to catch the catch opening in the riser portion of the lift bracket when the lift bracket engagement end of the lift handle is fully inserted in the lift bracket. When the food container is lifted by the handle, the weight of the food container will maintain the engagement of the lift handle and lift bracket.

U.S. D891,171 relates to an ornamental design for a pan with disconnectable handle.

U.S. 2021/0022560 relates to a removable cookware handle having an elongated handle section. The elongated handle section has first and second ends, wherein at the first end of the handle section there is the means for removable attachment to the attachment point on a cookware container and a means for locking the removable handle to the attachment point. The attachment point in on the cookware container comprises a bracket that has a depending section attached to a side wall of the cookware container and a flange at the top edge of the depending section and extending outwardly from the side wall of the cookware container. A non-circular elongated opening is centrally located through the flange and generally orientated with its longitudinal axis generally parallel to the side wall of the cookware container. The opening is sized and shaped to engage with the means for removable attachment on the handle.

U.S. 2021/0186264 relates to an integrated pan and spatula system; the integrated pan and spatula system including a cooking vessel and a removably attachable cooking utensil. The cooking utensil includes a handle, a cooking-utensil-head, and cooking-utensil-locking-assembly. The cooking vessel features an inner cooking surface encompassed by a sidewall, a bottom plane including a slot configured to receive the cooking-utensil-head through an open-end of the slot, and a pan-locking-assembly. The pan-locking-assembly and the cooking-utensil-locking-assembly have mating portions and are configured to removably interlock and secure the cooking-utensil-head within the slot of the cooking vessel.

U.S. 2023/0014523 relates to a cookware system, including a cookware member, with an internal region for heating food and an outer edge disposed about a perimeter of the cookware member. The outer edge including a first pair of adjacent slots extending through a thickness of the outer edge and inwardly from the perimeter; the first pair of slots defining a first notch having a top surface and a bottom surface. There is a first removable handle, including a grip member at a first end, an engagement member at a second end, and an extension member interconnecting the grip member to the engagement member. The engagement member includes a first leg, a second leg, a first crossbar, and a second crossbar; and the first crossbar is interconnected between the first leg and the second leg and the second crossbar is spaced from the first crossbar and interconnected between the first leg and the second leg.

Even in view of the above, the need still exists for a cookware system suitable for cooking, smoking and/or baking food.

SUMMARY OF THE INVENTION

The problems noted above and others are solved by the cookware system disclosed herein which is suitable for cooking, smoking and/or baking foodstuffs.

The cookware system provides a device for easily smoking or baking foodstuffs such as cream cheese without requiring the need for foil, in particular aluminum foil. The cooking system provides a tray having angled sides which beneficially allows scooping foodstuffs, toppings or the like from the food cooking surface of the device.

Advantageously, the cooking system is provided with two separate handles, a first that is integral with the tray and can be utilized to move the tray with or without food thereon wherein the tray and handle are at ambient temperatures or close to ambient temperatures. Still further, a second handle is provided as part of a serving utensil, wherein the serving utensil also has an implement for manipulating food. The implement of the serving utensil is insertable into a slot of a grip arm of the handle integrally connected to the tray and the serving utensil handle can be utilized to move the handle integrally connected to the tray, as well as the tray. As the serving utensil is detachable from the tray with integral handle, the serving utensil handle is beneficially temporarily utilized as necessary while the tray and food are being heated to move the tray, or after heating or cooking of the food has been accomplished.

Yet another benefit of the cookware system is provided as the implement for manipulating food can be utilized before or after cooking, smoking and/or baking. For example, after cooking, etc., the serving utensil implement, for example a spreader, can be utilized to remove a portion of food such as cream cheese from the tray and place the same on a cracker or other desired edible substrate.

In one aspect or embodiment, a cookware system suitable for cooking, smoking and/or baking food, is disclosed comprising a tray comprising a food cooking surface adapted to be placed on a horizontal surface of a cooking device, and a handle integrally connected to the tray, the handle comprising: a) a handle base having a first end connected to the tray, the handle base rising at least upwardly from the tray, and b) the handle further including a grip arm connected to the handle base and extending outwardly from the handle base in a direction away from the tray, and wherein the grip arm has a slot extending between an upper surface of the grip arm for accepting a serving utensil.

In a further aspect or embodiment, the serving utensil and the serving utensil have a handle connected to an implement for manipulating food, wherein the serving utensil handle cannot be inserted into the slot of the grip arm, and wherein the implement is insertable into the slot of the grip arm.

In an additional aspect or embodiment, the serving utensil handle is less heat conductive than the implement.

In yet a further aspect or embodiment, the serving utensil handle comprises a wooden or plastic knob, and wherein the implement comprises metal.

Still another aspect or embodiment, the implement comprises a spreader, spoon, spatula, knife, fork or spork.

In a further aspect or embodiment, the slot has a length, wherein the slot length runs substantially perpendicular to a longitudinal length of the grip arm.

In an additional aspect or embodiment, the slot has a width that is less than the slot length.

In yet a further aspect or embodiment, the tray comprises a raised edge that extends upwardly from an outer edge of the food cooking surface.

In still another aspect or embodiment, the handle base extends both upwardly and outwardly from the tray.

In a further aspect or embodiment, the handle base forms a plane that is situated at an angle of from about 10° to about 80° in relation to a plane formed by the food cooking surface.

In an additional aspect or embodiment, the angle is from about 30° to about 60°.

In yet a further aspect or embodiment, the food cooking surface forms a first plane, and the grip arm forms a second plane, and wherein the first plane and the second plane are substantially parallel.

Still another aspect or embodiment, the tray and handle are integrally formed, and wherein the tray and handle are metal.

In a further aspect or embodiment, the metal is stainless steel.

For the avoidance of doubt, it is understood that while various embodiments or aspects of the invention are described individually, it should be clear that two or more embodiments or aspects can be, and often times are, present in a single device according to the present invention.

BRIEF DESCRIPTION OF THE DRAWINGS

The invention will be better understood and other features and advantages will become apparent by reading the detailed description of the invention, taken together with the drawings, wherein.

DETAILED DESCRIPTION

Figure 1:
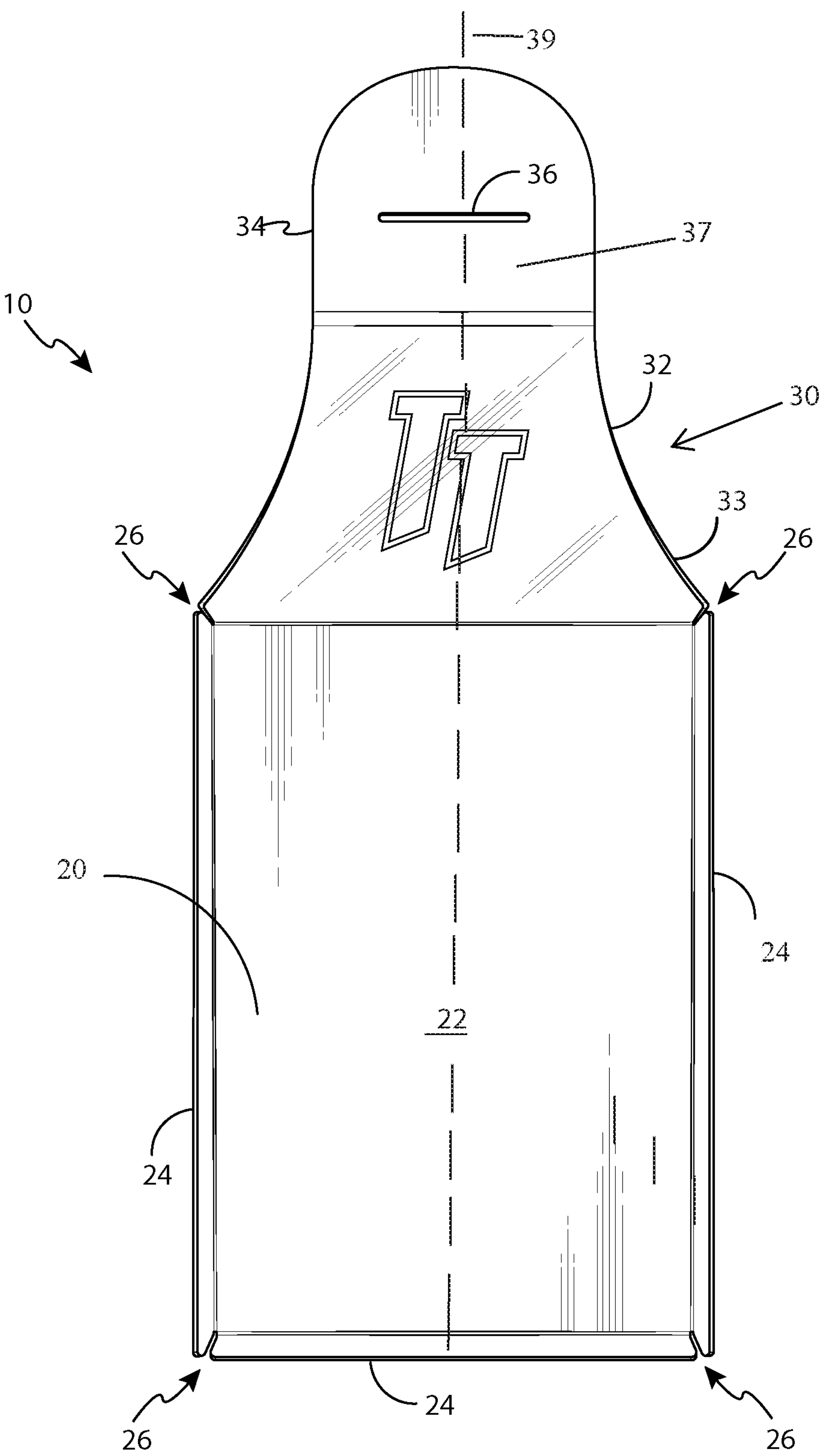
FIG. 1 is top view of a cookware system being a tray with an integrated handle.
Figure 2:
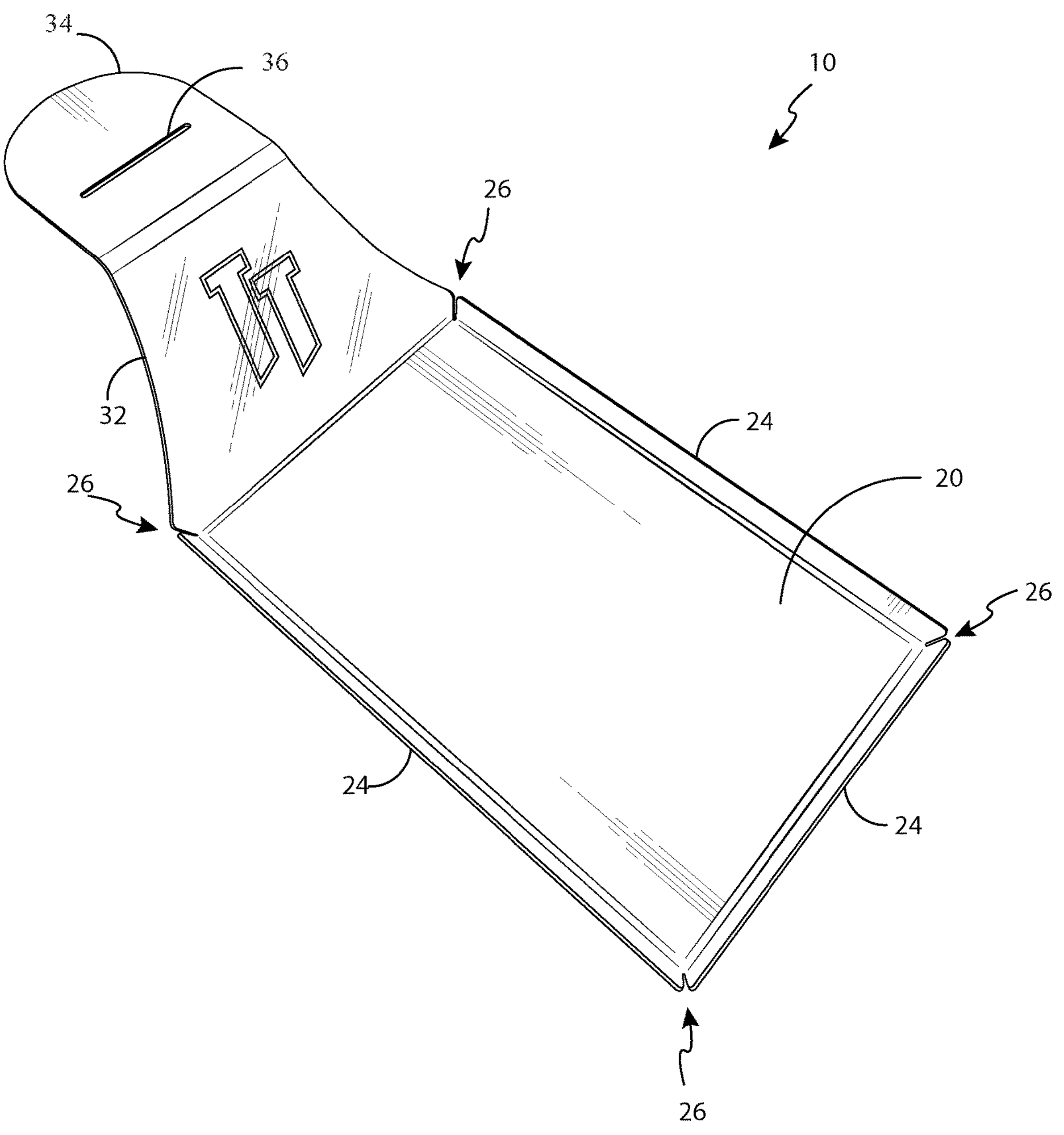
FIG. 2 is a top right front perspective view thereof.
Figure 3:
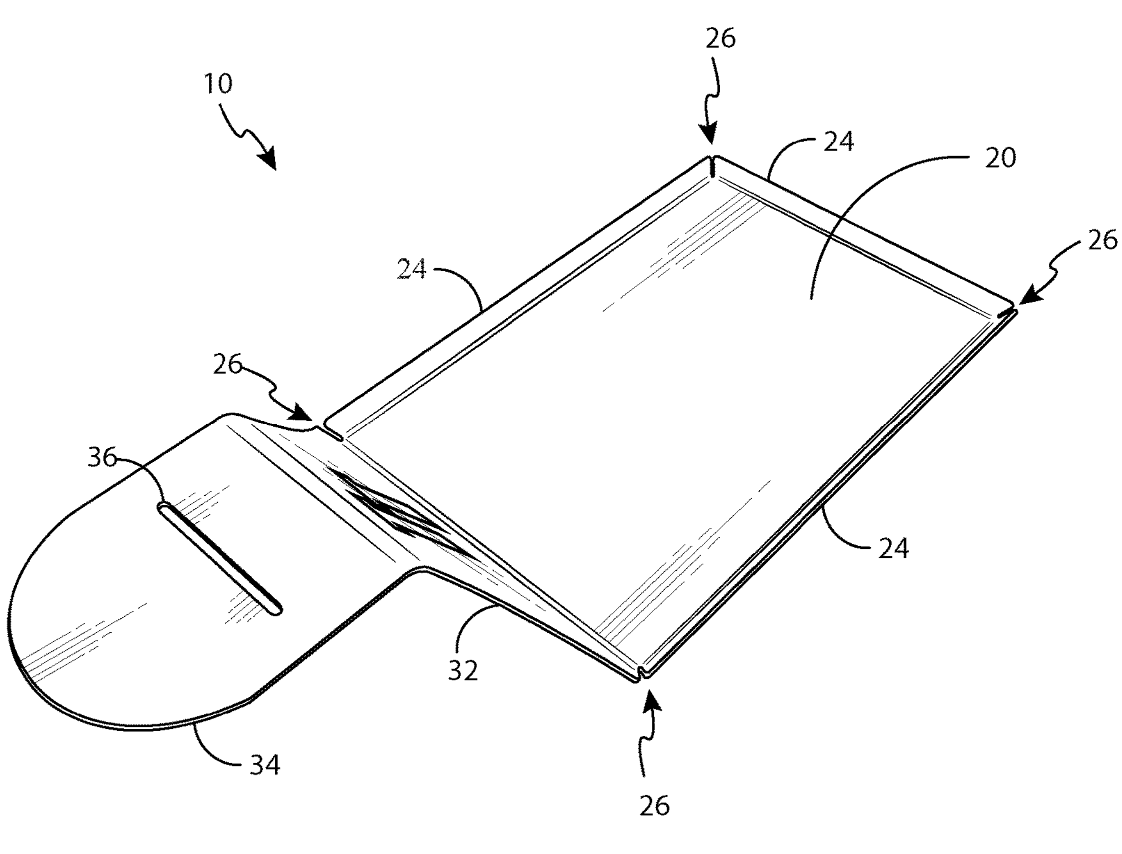
FIG. 3 is a top right rear perspective view thereof.

This description of preferred embodiments is to be read in connection with the accompanying drawings, which are part of the entire written description of this invention. In the description, corresponding reference numbers are used throughout to identify the same or functionally similar elements. Relative terms such as “horizontal,” “vertical,” “up,” “upper”, “down,” “lower”, “top” and “bottom” as well as derivatives thereof (e.g., “horizontally,” “downwardly,” “upwardly,” etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figures 11, 12:
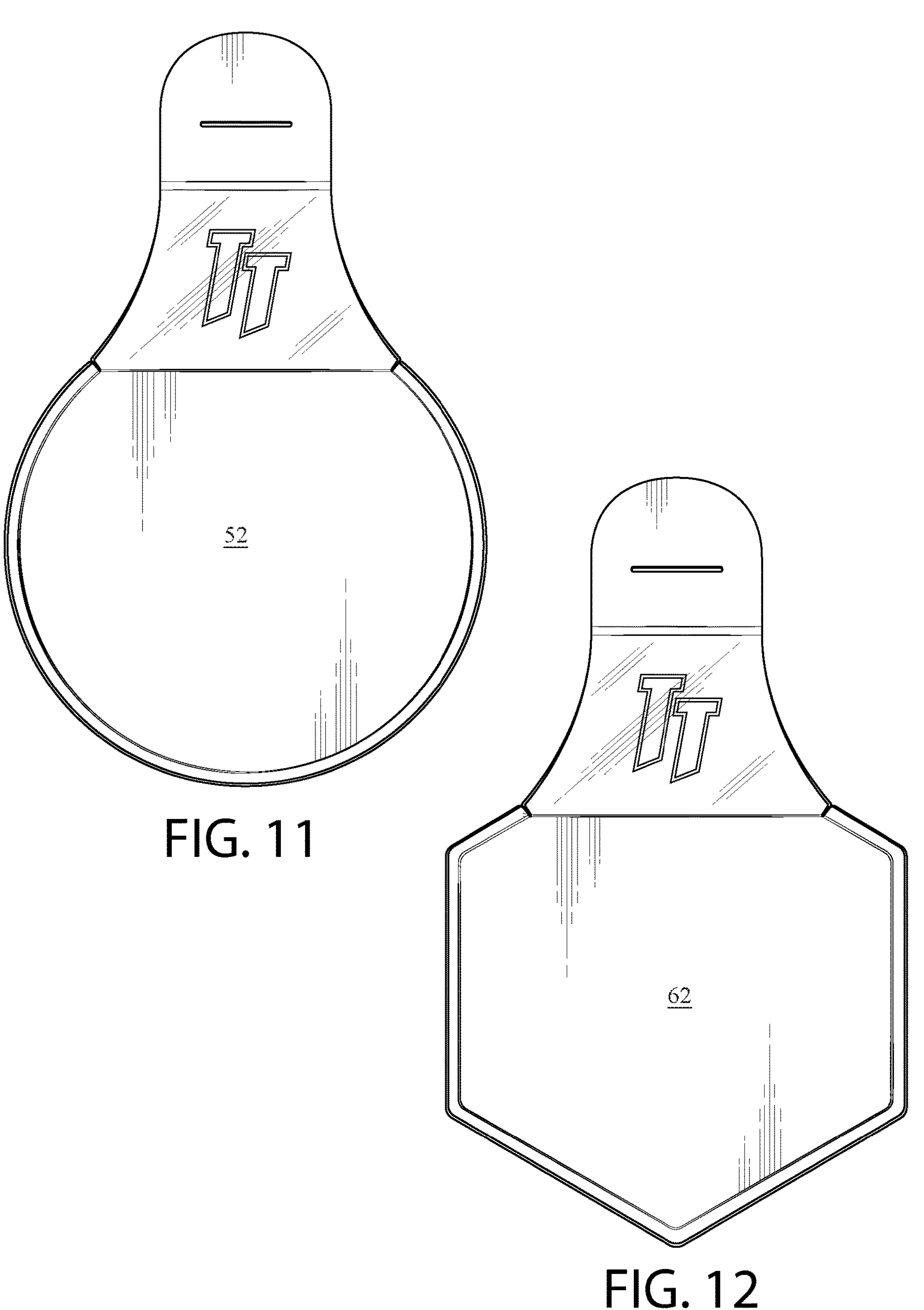
FIG. 11 is a top view of a cookware system having a tray with a different configuration compared to FIG. 1.
FIG. 12 is a top view of a cookware system having a tray with a different configuration compared to FIG. 1.

Referring now to the drawings, wherein like reference numbers are used to describe like parts throughout the several views, FIGS. 1-7 illustrate cookware system 10 including a tray 20 having a handle 30 integrally connected to the tray. The tray 20 comprises a food cooking surface 22 adapted to be placed on a horizontal surface of a cooking device. The food cooking surface 22 illustrated in FIGS. 1-7 is substantially rectangular. It should be clear to one of ordinary skill in the art that other shapes can be utilized, for example see FIG. 11 which includes a substantially circular food cooking surface 52 and FIG. 12 which includes a truncated hexagonal food cooking surface 62.

The tray includes a raised edge 24 that extends upwardly a preferably outwardly from an outer edge of the food cooking surface 22. The height of the raised edge can vary and in one embodiment serves to maintain any food and/or toppings added to the food cooking surface 22 without spilling out over the raised edge 24. Tray 20 illustrated in FIGS. 1-10 includes multiple corner angles 26 which are formed during the manufacturing process.

Handle 30 permanently connected to tray 20 includes a handle base 32 having a first end generally shown using reference number 33 connected to tray 20. Handle base 32 rises at least upwardly and preferably upwardly and outwardly away from tray 20 and in particular cooking surface 22.

The handle further includes a grip arm 34 integrally connected to handle base 32. Grip arm 34 extends outwardly from handle base 32 in a direction away from tray 22. The grip arm is preferably utilized whenever handle 30 is at a temperature that will not cause discomfort to the user. Ideally, the handle is utilized when the temperature thereof is cool to the touch.

Handle 30 includes a slot 36 on grip arm 34 which extends between an upper surface 37 and lower surface 38. Slot 36 preferably has a length that extends perpendicular to a longitudinal length or axis 39 of the handle. The slot has a width generally measured in the direction of the longitudinal length or axis 39 of the handle. The slot length is preferably greater than the slot width.

Tray 20 and handle 30 are preferably formed from a single piece of material. The tray and handle are preferably constructed from a food grade and/or food safe material such as stainless steel. However, it could be constructed from any temperature safe material such as titanium, aluminum, silicone or the like. The material may be treated with one or more coatings, for example a nonstick coating.

The handle 30 and tray 20 can be formed for example by stamping and/or laser cutting the desired material. The material can be bent or formed to include any preferred raised edge height, handle base angle, and grip arm configuration. The combination of food cooking surface 22 and raised edges 24 create a bowl, pan or the like which allow sauce or other liquids to be contained on the food cooking surface.

Figure 4:
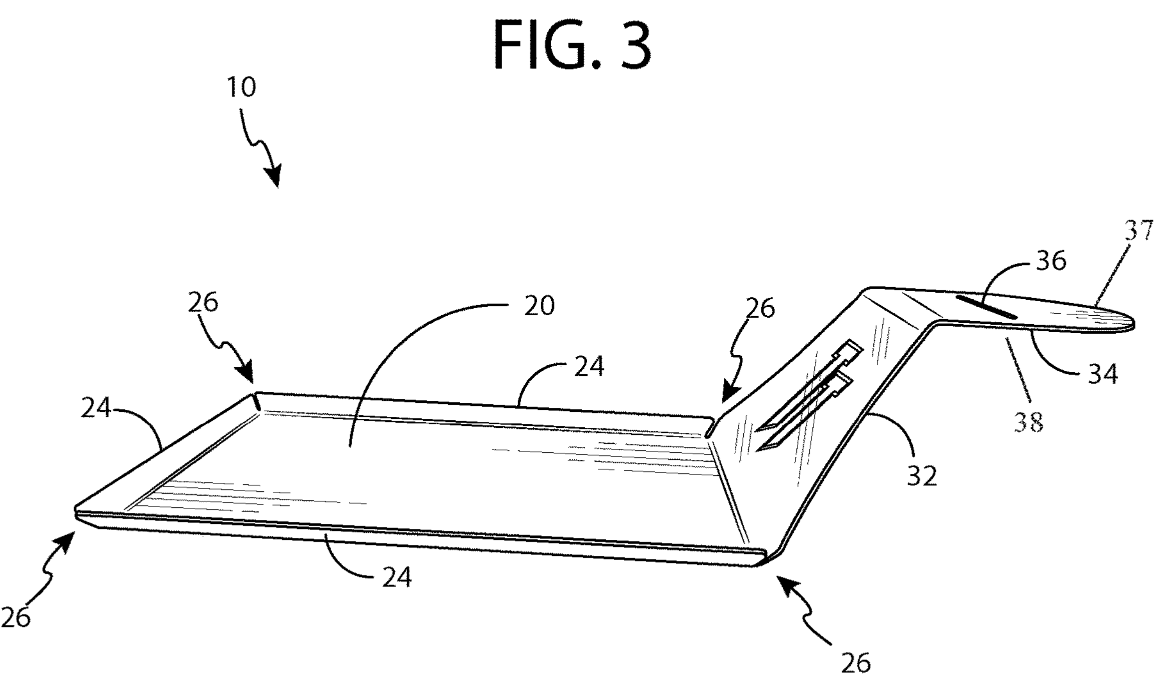
FIG. 4 is an upper left side perspective view thereof.
Figure 5:
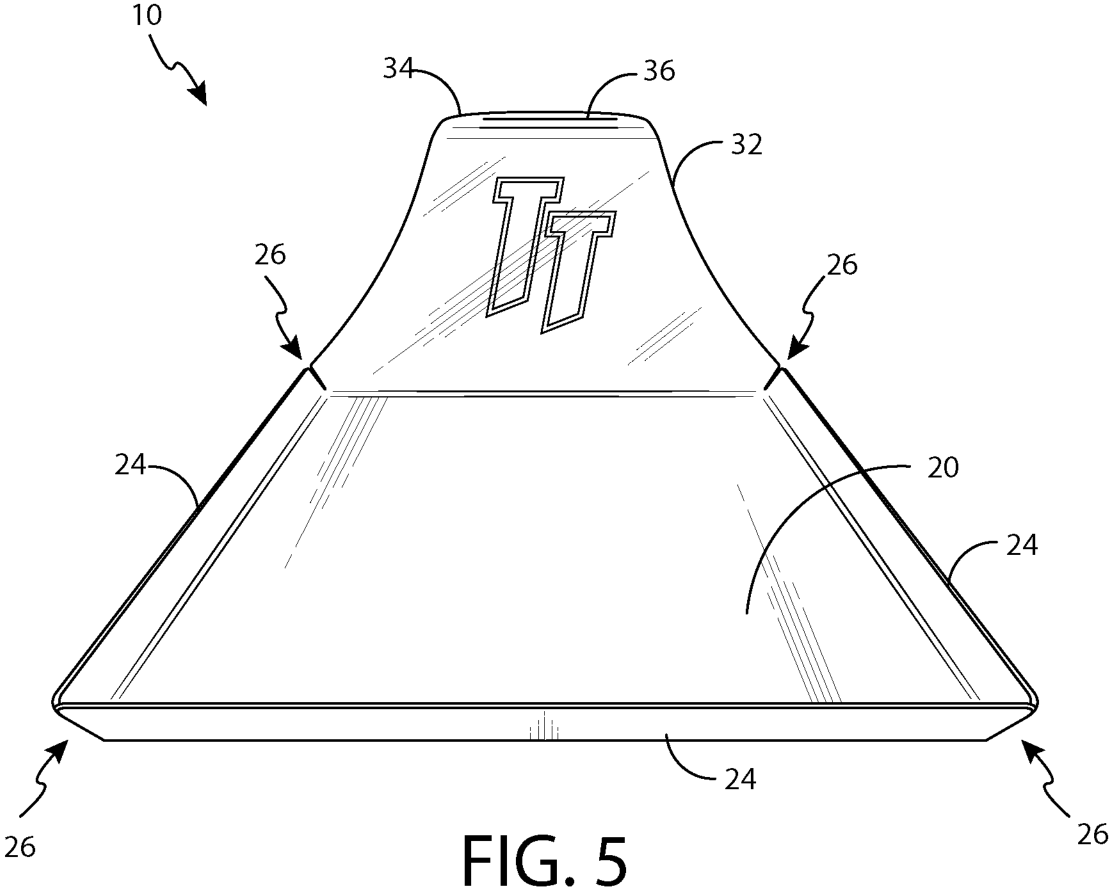
FIG. 5 is an upper front perspective view thereof.
Figure 6:
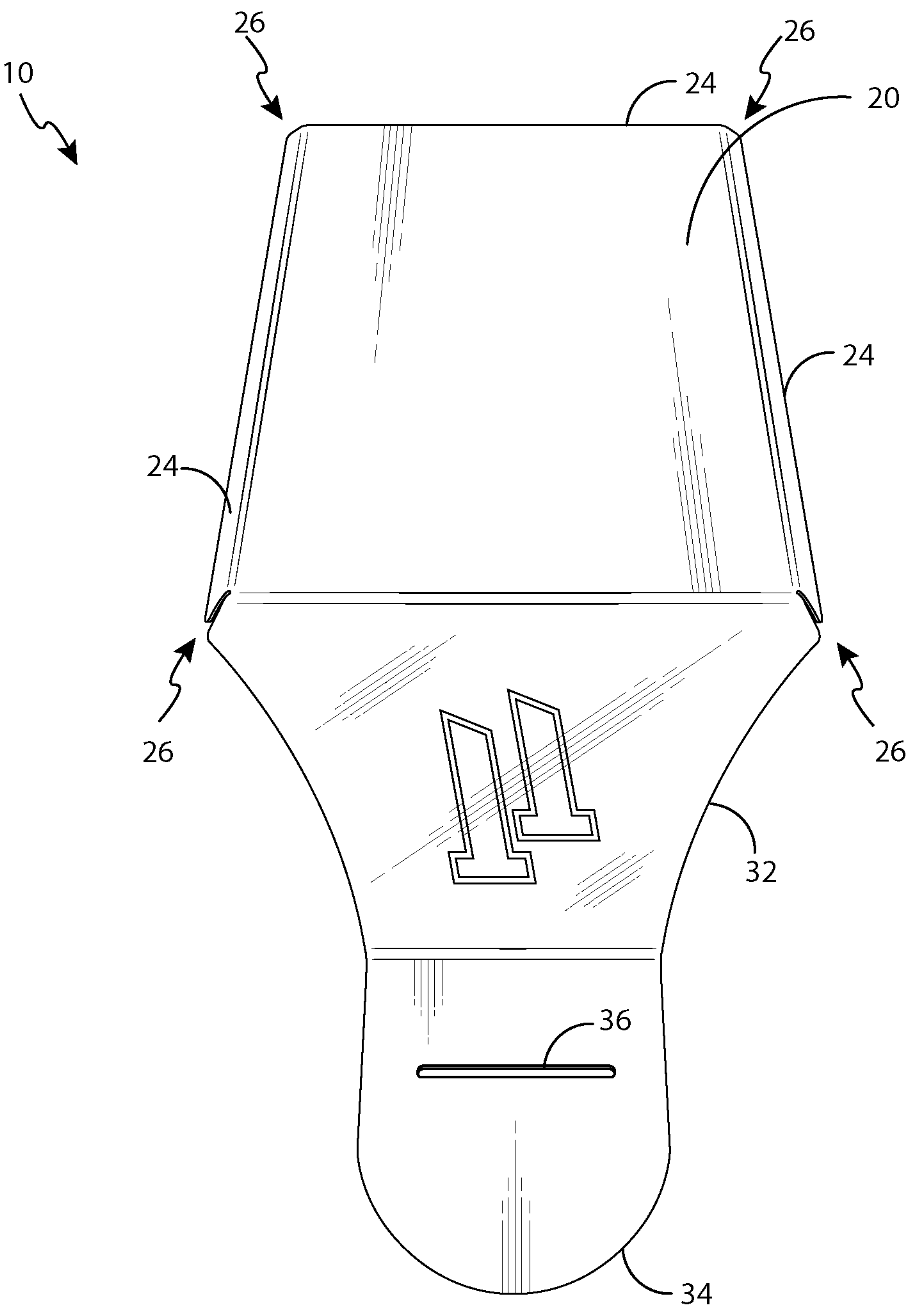
FIG. 6 is a bottom rear perspective view.
Figure 7:
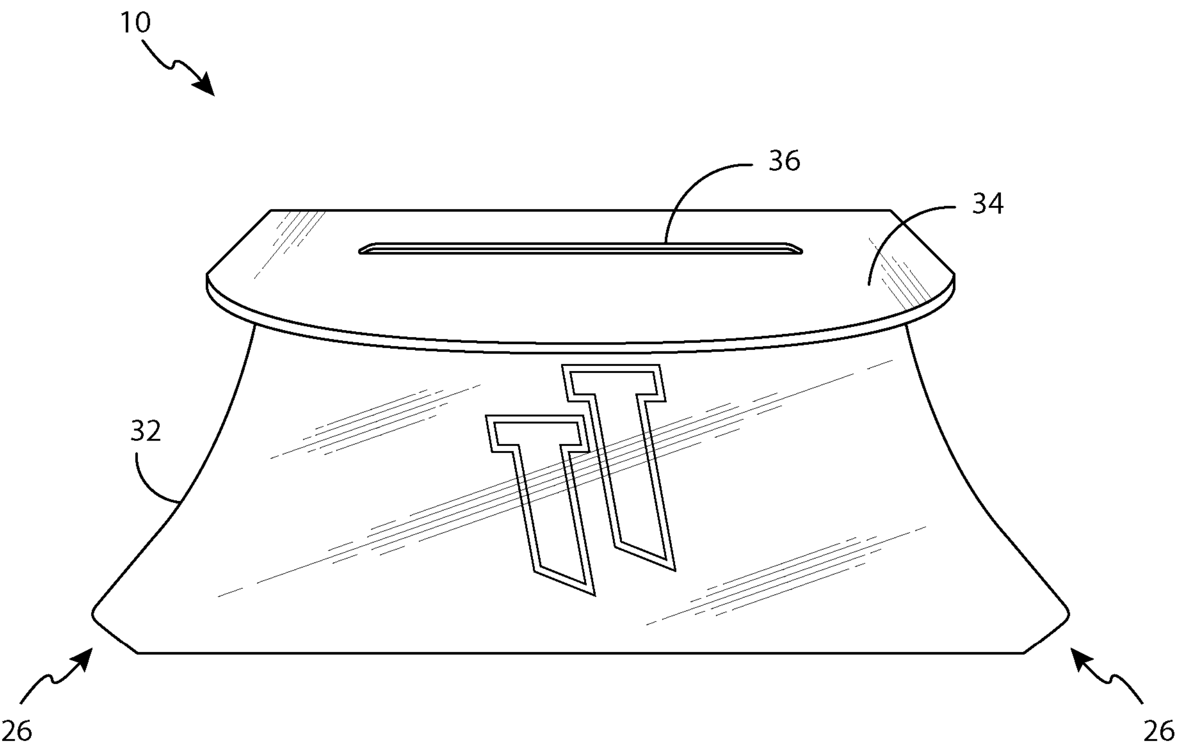
FIG. 7 is an upper rear perspective view thereof.

In one embodiment, the handle base 32 forms a plane that is situated at an angle from about 10° to about 80° in relation to a plane formed by the food cooking surface. In a preferred embodiment, the angle is from about 30° to about 60°. The food cooking surface 22 forms a first plane, and the grip arm 34 forms a second plane. The first plane and second plane are substantially parallel in a preferred embodiment, for example as illustrated in FIG. 4.

Figure 8:
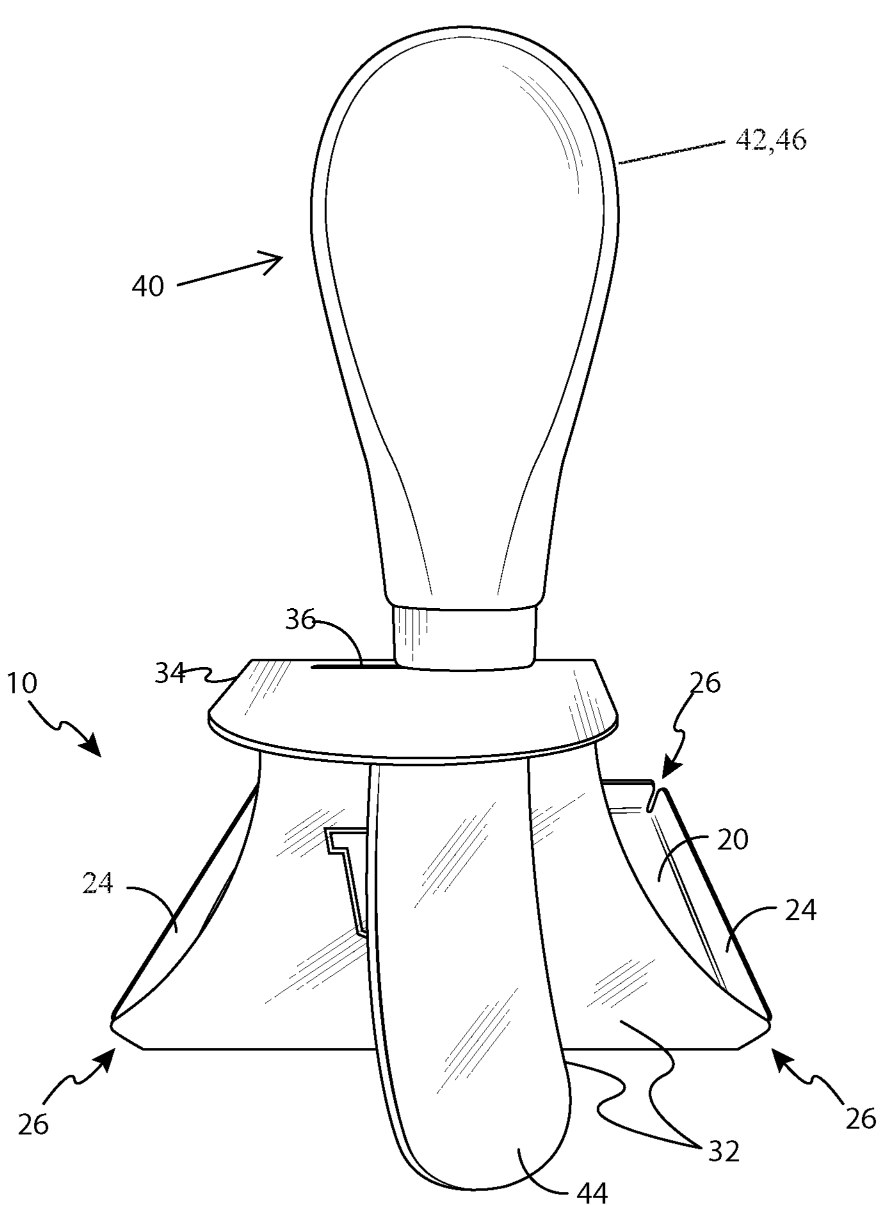
FIG. 8 is an upper rear perspective view thereof further including a serving utensil having a handle connected to an implement, with the implement inserted into a slot present on the handle.
Figure 9:
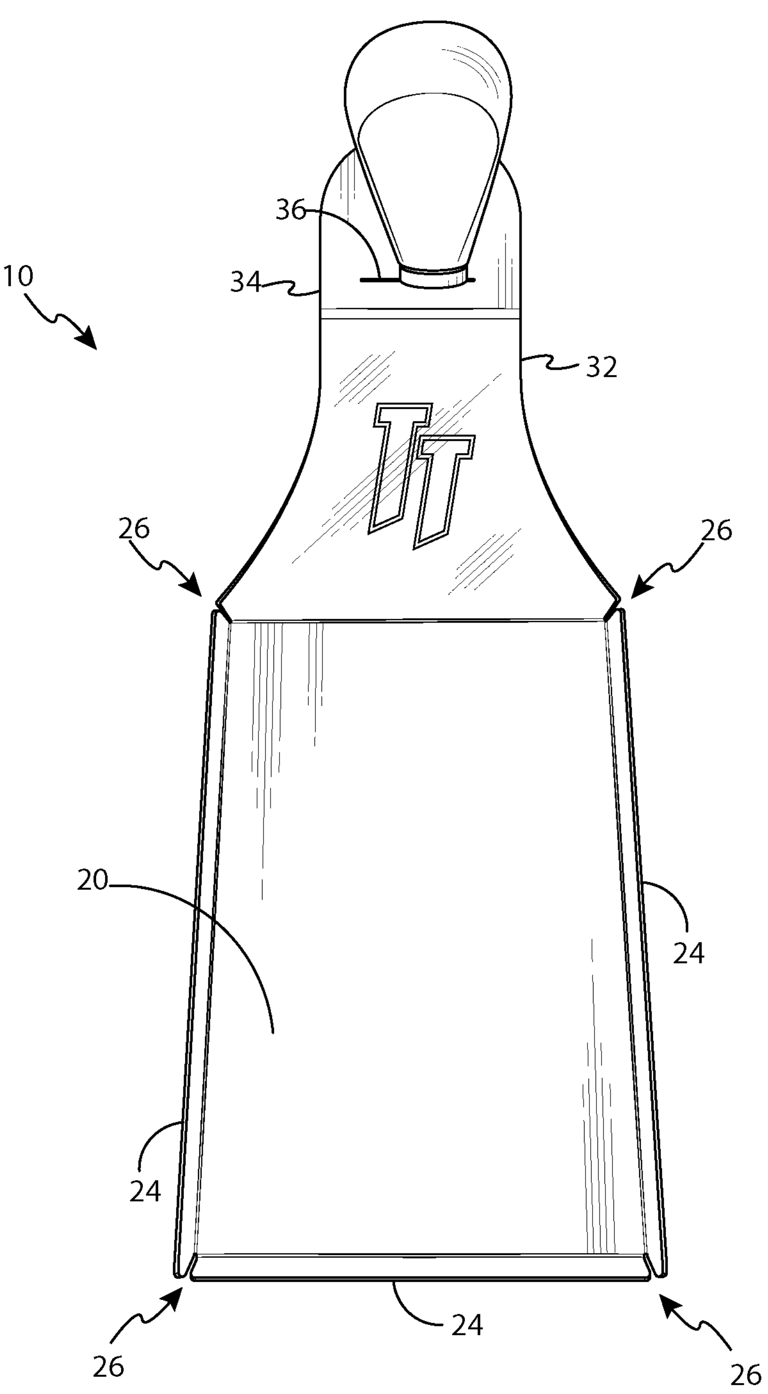
FIG. 9 is an upper front perspective view thereof.
Figure 10:
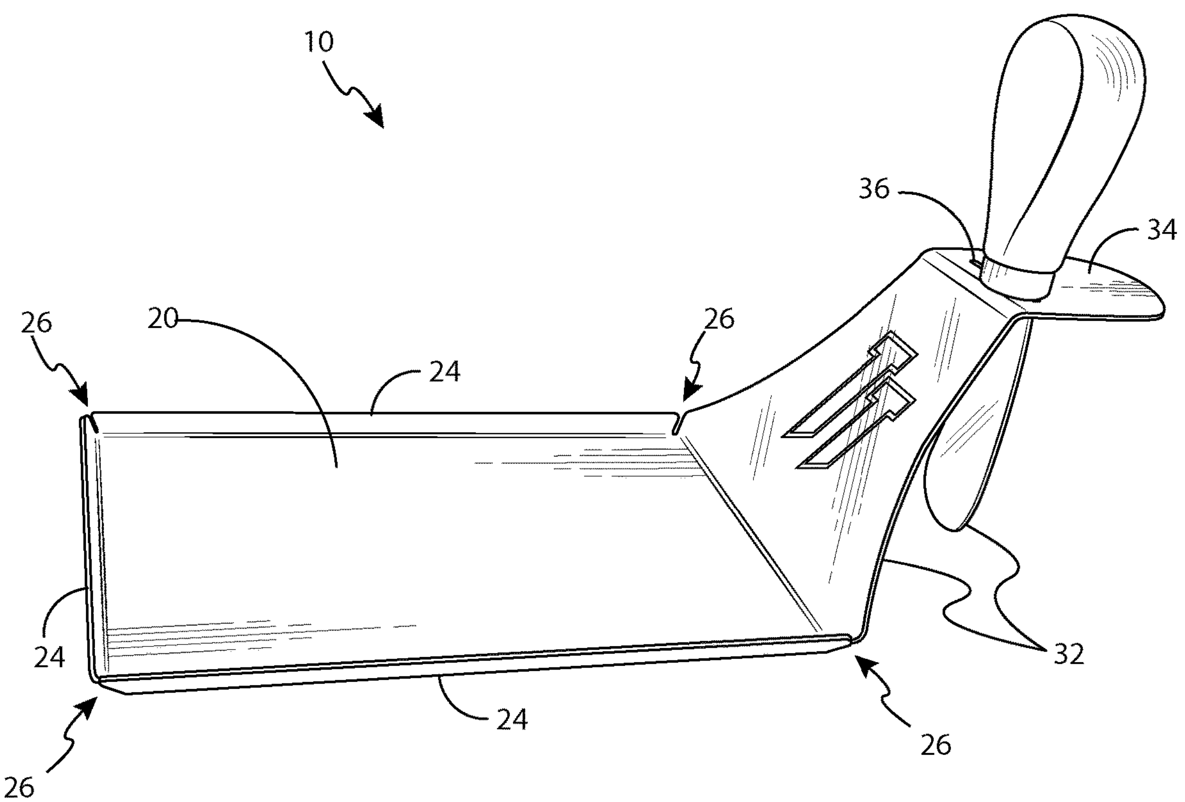
FIG. 10 is an upper left side perspective view thereof.

As illustrated in FIGS. 8-10, the cookware system 10 includes a serving utensil 40 having a serving utensil handle 42 connected to an implement 44 for manipulating food. As illustrated, the serving utensil handle 42 can be formed as a knob 46. Other shapes can be utilized such as, but not limited to, cylinders, cubes and the like. The implement 44, on the other hand is especially designed to include a portion that allows it to be passed through slot 36. The implement 44 illustrated in FIGS. 8-10 is a spreader. However, it is to be understood that other implements can be utilized, for example, but not limited to, spoons, spatulas, knives, forks, or sporks.

In a preferred embodiment, the serving utensil is less heat conductive than the implement. This is advantageous as the handle can be utilized to transport the heated tray 20 and handle 30 integrally connected with the tray during or after cooking, for example by inserting the implement into the slot to the position shown in FIGS. 8-10. When the implement 44 is braced against the slot by friction and the serving utensil 40 is manipulated away from the food cooking surface 22, the tray can be lifted and placed at a different location.

The cookware system 10 can be utilized as follows. A food to be cooked is placed upon food cooking surface 22. Handle 34 is utilized by the cook to lift the tray 20 and place it in or on a cooking device. Once the food is at least partially cooked or fully cooked, the tray 20 can be moved by inserting the implement of the serving utensil 40 into the slot 36 whereby the tray 20 and integrally handle 30 can be moved as desired.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A cookware system suitable for cooking, smoking and/or baking food, comprising:

a tray comprising a food cooking surface adapted to be placed on a horizontal surface of a cooking device, and a handle integrally connected to the tray, the handle comprising:

a) a handle base having a first end connected to the tray, the handle base rising at least upwardly from the tray, and b) the handle further including a grip arm connected to the handle base and extending outwardly from the handle base in a direction away from the tray, and a serving utensil having a handle connected to an implement for manipulating food, wherein the serving utensil handle cannot be inserted into the slot of the grip arm, and wherein the implement is insertable into the slot of the grip arm; and wherein the grip arm has a slot extending between an upper surface and a lower surface of the grip arm for accepting a serving utensil.

2. The cookware system according to claim 1, wherein the serving utensil handle is less heat conductive than the implement.

3. The cookware system according to claim 2, wherein the serving utensil handle comprises a wooden or plastic knob, and wherein the implement comprises metal.

4. The cookware system according to claim 3, wherein the implement comprises a spreader, spoon, spatula, knife, fork or spork.

5. The cookware system according to claim 1, wherein the slot has a length, wherein the slot length runs substantially perpendicular to a longitudinal length of the grip arm.

6. The cookware system according to claim 5, wherein the slot has a width that is less than the slot length.

7. The cookware system according to claim 1, wherein the tray comprises a raised edge that extends upwardly from an outer edge of the food cooking surface.

8. The cookware system according to claim 1, wherein the handle base extends both upwardly and outwardly from the tray.

9. The cookware system according to claim 8, wherein the handle base forms a plane that is situated at an angle of from about 10° to about 80° in relation to a plane formed by the food cooking surface.

10. The cookware system according to claim 9, wherein the angle is from about 30° to about 60°.

11. The cookware system according to claim 1, wherein the food cooking surface forms a first plane, and the grip arm forms a second plane, and wherein the first plane and the second plane are substantially parallel.

12. The cookware system according to claim 1, wherein the tray and handle are integrally formed from a single piece of material, and wherein the tray and handle are metal.

13. The cookware system according to claim 12, wherein the metal is stainless steel.

14. A cookware system suitable for cooking, smoking and/or baking food, comprising:

a tray comprising a food cooking surface adapted to be placed on a horizontal surface of a cooking device, and a handle integrally connected to the tray, the handle comprising:

a) a handle base having a first end connected to the tray, the handle base rising at least upwardly from the tray, and b) the handle further including a grip arm connected to the handle base and extending outwardly from the handle base in a direction away from the tray, and wherein the grip arm has a slot extending between an upper surface and a lower surface of the grip arm for accepting a serving utensil, and wherein the tray comprises a raised edge that extends upwardly from an outer edge of the food cooking surface, and wherein the raised edge is not directly connected to the handle base.

15. The cookware system according to claim 14, further including the serving utensil, the serving utensil having a handle connected to an implement for manipulating food, wherein the serving utensil handle cannot be inserted into the slot of the grip arm, and wherein the implement is insertable into the slot of the grip arm.

16. The cookware system according to claim 15, wherein the serving utensil handle is less heat conductive than the implement, wherein the serving utensil handle comprises a wooden or plastic knob, and wherein the implement comprises metal.

17. The cookware system according to claim 16, wherein the slot has a length, wherein the slot length runs substantially perpendicular to a longitudinal length of the grip arm, wherein the slot has a width that is less than the slot length.

18. The cookware system according to claim 17, wherein the handle base extends both upwardly and outwardly from the tray, wherein the handle base forms a plane that is situated at an angle of from about 10° to about 80° in relation to a plane formed by the food cooking surface.

19. The cookware system according to claim 18, wherein the food cooking surface forms a first plane, and the grip arm forms a second plane, and wherein the first plane and the second plane are substantially parallel, wherein the tray and handle are integrally formed from a single piece of material, and wherein the tray and handle are metal.

* * * * *